United States Patent [19]
Nesbit

[11] 3,954,145
[45] May 4, 1976

[54] DRIVE ARRANGEMENT FOR MOTORCYCLES AND THE LIKE

[76] Inventor: Glenn S. Nesbit, 6552 San Carlos, Paramount, Calif. 90723

[22] Filed: Mar. 1, 1974

[21] Appl. No.: 447,214

[52] U.S. Cl. ................................ 180/33 C; 64/19; 74/217 R; 74/217 B; 180/33 B
[51] Int. Cl.² ............................................. B62D 3/00
[58] Field of Search ................ 74/217 B, 230.17 A, 74/231 R, 231 C, 234, 217 R; 64/19 R; 180/33 R, 33 A, 33 B, 33 C

[56] References Cited
UNITED STATES PATENTS

| | | | |
|---|---|---|---|
| 2,560,991 | 7/1951 | Schuricht | 180/33 B |
| 2,792,236 | 5/1957 | Jacquart | 180/33 R |
| 3,017,977 | 1/1962 | Becker et al. | 74/217 R |
| 3,318,408 | 5/1967 | Hopkins | 74/217 R |
| 3,653,273 | 4/1972 | Albertson | 74/217 B |
| 3,698,497 | 10/1972 | Bombardier | 74/230.17 A |

FOREIGN PATENTS OR APPLICATIONS

| | | | |
|---|---|---|---|
| 920,054 | 3/1963 | United Kingdom | 74/231 |

Primary Examiner—Samuel Scott
Assistant Examiner—Randall Heald
Attorney, Agent, or Firm—Don B. Finkelstein

[57] ABSTRACT

An improved drive for use as between the engine and the clutch or transmission of a motorcycle and as between the clutch or transmission and the drive wheel. Instead of a metallic chain, a toothed timing belt of flexible or synthetic fabric material is used. The belt teeth of the pulleys on the shaft of the engine, on the shaft of the clutch or transmission and on the shaft of the rear wheel are machined to have a shape and configuration to adapt them to receive the teeth on the timing belt. The same type of belt is used between the engine and the clutch or transmission and between the clutch or transmission and the rear wheel. In the preferred form of the invention a sleeve housing is provided with peripheral teeth and of a shape to fit back over the clutch or transmission.

5 Claims, 7 Drawing Figures

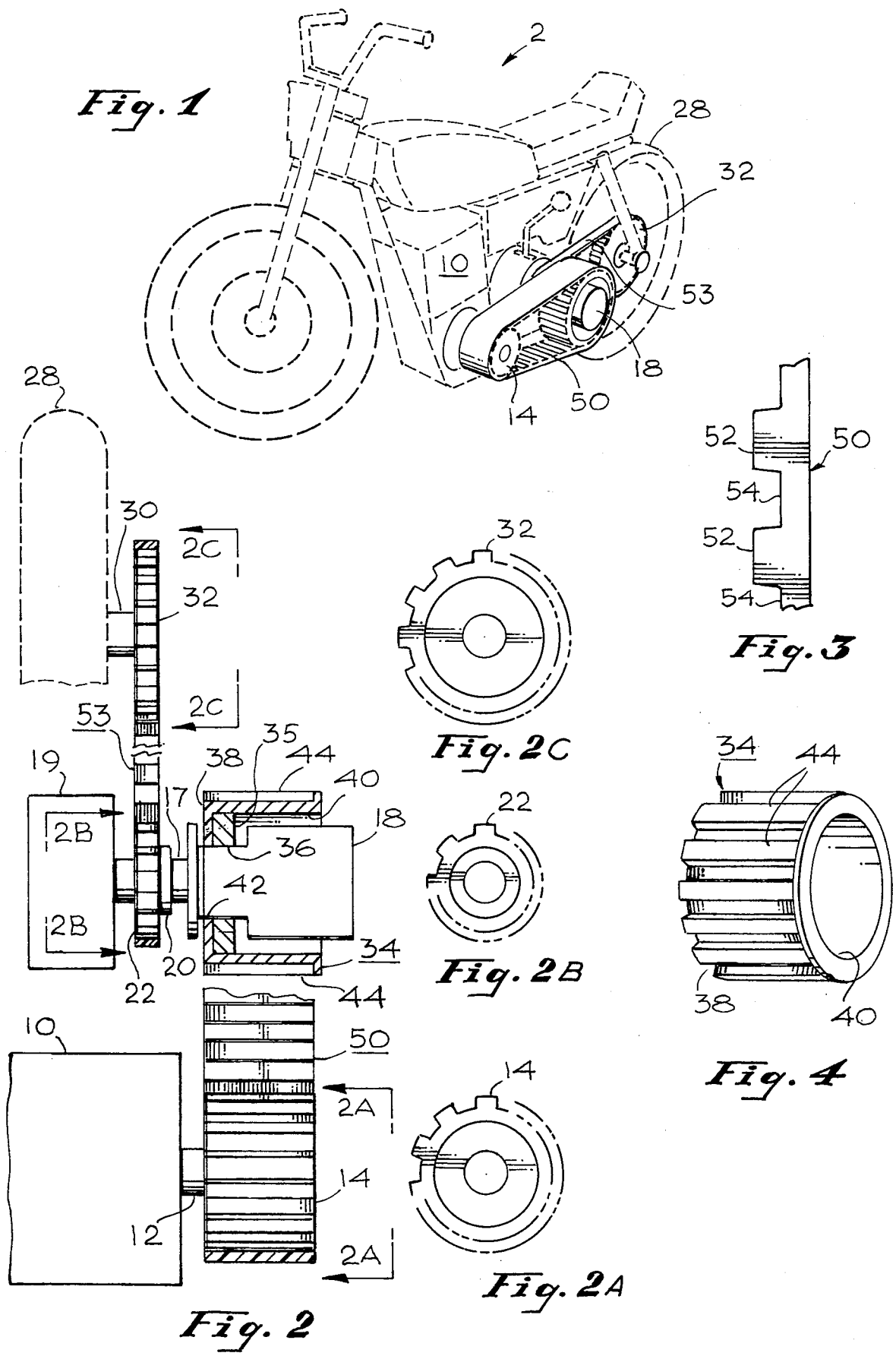

DRIVE ARRANGEMENT FOR MOTORCYCLES AND THE LIKE

BACKGROUND OF THE INVENTION

1. Field of the Invention

The invention relates to drive means for vehicles more particularly motorcycles and especially to drive means using a flexible toothed belt as between the engine and the clutch and, if desired, also between the clutch and transmission and the rear wheel.

2. Description of the Prior Art

In the drive of vehicles such as motorcycles typically in the prior art the drive utilized has been a chain drive. This drive means required a gear or sprocket wheel on the shaft of the engine, a gear or sprocket wheel on the main shaft of the transmission on the power side of the clutch, a further gear or sprocket wheel on the counter shaft of the transmission and then a corresponding gear or sprocket wheel on the shaft of the rear wheel. Two metallic chains were used, one between the engine and clutch and one between the transmission and the rear wheel. The chains used are, of course, heavy, expensive, require lubrication, are noisy, have considerable vibrations and otherwise lack many desirable characteristics and attributes not attainable in a metallic chain. The herein invention accordingly seeks to provide an improvement in the drive means as referred to for motorcycles which not only overcomes all of the deficiencies and drawbacks attendant to the metallic prior art chains as described and at the same time realize a large number of desirable advantages as outlined hereinafter.

SUMMARY OF THE INVENTION

In a preferred exemplary form of the invention as described in detail herein the drive is provided not by way of metallic chains but rather by way of timing belts. These belts are of a known type of construction, the belts being constructed of flexible synthetic or fabric material so that they bend easily and are flexible and have give. In the exemplary form of the invention the gears or toothed pulleys on the engine shaft, on the clutch or transmission and on the rear wheel are machined so that the teeth have a configuration adapting them to fit into the teeth on the timing belt which typically are relatively square shouldered teeth. Preferably a sleeve or drum is provided which fits onto the clutch housing, the drum having a skirt part which extends back axially over the clutch housing. The drum or sleeve is provided with teeth which extend the full axial length of the drum or housing for purposes which will be referred to more in detail hereinafter. The primary belt extends from the gears on the engine to fit over the teeth on the drum or sleeve and the secondary belt extends from the gear or pulley on the countershaft of the transmission to a gear or pully on the rear wheel.

The exemplary construction briefly referred to in the foregoing makes possible the realization of a large number of advantages and beneficial results. Because of the belts being made of fabric material and flexible there is considerably less vibration involved and correspondingly less wear. This comes about due to the fact that there is considerably less relative mass in the belts than in metallic chains. The belts can be more perfectly balanced both statically and dynamically. The timing belts have "give" to check shock or misalignment without the introduction of high forces.

A further object is to realize longer life in the drive mechanism there being no moving parts in the belts themselves such as there is in the link chains or roller chains. By reason of the flexibility and give in the belts there is less wear on the pulley teeth as well as on the belt itself.

A further object is to realize drive mechanisms requiring less maintenance and requiring no lubrication whatever. A correllary advantageous result is that there is no drip or splash of lubrication from the drive mechanism.

A further object is to realize a drive means as described when the parts used are more readily available and obtainable at lower cost as well as having less weight and being considerably easier to install and/or replace.

A still further object is to realize the purpose that the gears used on the shafts of the mechanism can be lighter and of less expensive contruction.

Yet another object and advantage that is realized is that there is less loading on the pulley and both the pulley and the drive belts are easier to replace than when chains are used.

A still further object and advantage realized is that the drive belt can be made considerably wider with the result that lower unit forces and stresses are involved since they are applied over a larger area, accordingly there is a greater area for heat dissipation.

Another object and advantage that is realized is that the amount of friction and heat generated by friction is reduced.

A still further object and advantage is that the life span of the components is significantly greater than that of the metallic chain and gears due to all of the foregoing advantages.

BRIEF DESCRIPTION OF THE DRAWINGS

Further objects and additional advantages of the invention will become apparent from the following detailed description and annexed drawings wherein:

FIG. 1 is a pictorial representation of a motorcycle using the invention on the primary belt;

FIG. 2 is a schematic view illustrating the drive of a motorcycle wheel from an engine using the belts of the invention;

FIG. 2A is a view along the line 2A—2A of FIG. 2;

FIG. 2B is a view along the line 2B—2B of FIG. 2;

FIG. 2C is a view along the line 2C—2C of FIG. 2;

FIG. 3 is a schematic view of a typical section of timing belt; and

FIG. 4 is a perspective view of a pulley useful in the practice of the present invention.

DESCRIPTION OF THE PREFERRED EMBODIMENTS

As shown in FIG. 1 of the drawing, there is a motorcycle, generally designated 2, having an engine 10 with a pulley 14 thereon. A clutch 18 is also provided upon which is mounted a transmission having an output pulley (not shown in FIG. 1). A primary belt 50 transmits power from the engine 10 to the clutch 18 and a secondary belt 53 transmits power from the transmission to a pulley 32 on the rear wheel 28.

Referring now more in detail to FIGS. 2 and 3 of the drawings wherein numeral 10 designates schematically the engine of the motorcycle 2 having a shaft 12 on which is mounted the pulley 14. Numeral 18 designates schematically the clutch of the motorcycle 2, and the clutch 18 is connected to the transmission 19 by a main shaft 17 and the transmission 19 has a countershaft 20 on which is pulley 22.

The rear wheel of the motorcycle is designated at 28 having a shaft 30 on which is a drive gear 32, or if desired, the drive gear 32 may be connected directly to rear wheel 28, as is often the case in many motorcycles.

Numeral 34 designates a drum or sleeve assembly comprised of a cylindrical member 35 having a circular bore or opening 36. Secured to the member 35 is a pulley 38 having a sleeve portion 40 that extends axially over the clutch as shown. The gear 38 has an opening or bore 42 aligned with the bore 36 and the clutch 18 extends through these openings to the transmission having a pulley 22 in a position as shown. On the outside of the skirt 40 of the gear 38 there are provided pulley teeth 44 which extend axially the full length of the skirt. These pulley teeth are formed or machined whereas to be configurated to mesh with and engage with the teeth of a primary belt 50 which, according to the present invention, may be a standard or typical timing belt.

A section of such a timing belt 50 is shown in FIG. 3 having teeth as shown at 52 separated by spaces 54. The belt, as known in the art, conventionally is made of a flexible synthetic or fabric material so as to easily bend around a pulley or a toothed wheel. Typically the teeth as shown at 52 have substantially square shoulders. The teeth 44, as stated, are machined to be configurated to be adapted to engage with the teeth on the primary belt 50.

The teeth on the gear or pulley 22 may be similarly machined to be configurated to mesh with the teeth on a secondary belt 53 which may also be a timing belt. The teeth on the gears or pulleys 14 and 32 are similarly machined to fit the teeth on the primary and secondary belts 50 and 53 respectively.

Primary belt 50 passes over the gear or pulley 14 on the shaft 12 of the engine 10 and over the teeth on the skirt 40 of gear or pulley 38. Pulley 38 drives the clutch 18 in conventional fashion and clutch 18, in turn drives transmission 19 through main shaft 17. Countershaft 20 is driven by transmission 19 and rotates pulley 22 to rotate the secondary belt 53 and thus drive the rear wheel 28 through pulley 32. As may be seen the drive as described is readily adapted to provide teeth of long axial length and correspondingly a wide belt or a belt of whatever width may be desired and may be appropriate, may be utilized. If desired, a wider belt can be used as the primary belt 50, between the engine and clutch than is used for the secondary belt 53 between the transmission and the rear wheel, coupling between these parts being relatively close.

From the foregoing those skilled in the art will readily understand the nature of the construction of the invention, its utility and the manner in which it achieves and realizes all of the objects and advantages set forth in the foregoing. Its considerable superiority over a metallic chain drive is readily apparent from the many detailed objects and advantages that are realized as have been enumerated in the foregoing.

The foregoing disclosure is representative of a preferred form of the invention and is to be interpreted in an illustrative rather than a limiting snese, the invention to be accorded the full scope of the claims appended hereto.

I claim:

1. Drive arrangement for motorcycle type vehicles, of the type having an engine, a clutch spaced from the engine, a transmission coupled to the clutch and driven by the engine through the clutch, and at least one drive wheel spaced from the transmission and driven by the transmission for propelling the vehicle, and said clutch having an engaged condition wherein the transmission is driven through the clutch, and a disengaged condition wherein driving of the transmission is prevented by the clutch, the improvement comprising, in combination:

said clutch having an input gear for transmitting power from said engine to said clutch to drive said transmission for said engaged condition of said clutch, and said input gear comprising:
a rotable, cylindrical tubular input sleeve having an outer surface, an inner surface, a first end and a second end, and a first axial width between said first end and said second end;
a cylindrical member coupled to said sleeve adjacent one of said first end and said second end thereof for transmitting rotary motion from said cylindrical sleeve into said clutch, and said cylindrical sleeve cantilevered from said cylindrical member; and
a plurality of premary belt engaging pulley teeth on said outer surface of said cylindrical sleeve extending substantially said first axial width;
said engine has an output gear having a second axial width and having a plurality of primary belt engaging gear teeth thereon and said gear teeth extending substantially said second axial width;
a primary, flexible, endless belt means having a primary belt width and further comprising a plurality of primary belt teeth thereon extending said primary belt width for engaging said belt engaging teeth of said output gear of said engine and said pulley teeth of said cylindrical sleeve of said clutch to transmit power from said engine to said clutch.

2. The arrangement defined in claim 1 wherein:
said primary belt width is substantially equal to said first axial width of said cylindrical sleeve of said clutch; and
said second axial width of said engine output gear substantially equal to said first axial width.

3. The arrangement defined in claim 2 and further comprising:
an output pulley on said transmission, and said output pulley having a third axial width and a plurality of secondary belt engaging teeth thereon extending substantially said third axial width;
a drive pulley on said at least one drive wheel having a fourth axial width and a plurality of secondary belt engaging teeth thereon extending substantially said fourth axial width;
a secondary, flexible, endless belt means having a secondary belt width and further comprising a plurality of secondary belt teeth thereon extending substantially said secondary belt width for engaging said output pulley of said transmission and said drive pulley of said at least one drive wheel for transmitting power from said transmission to said drive wheel.

4. The arrangement defined in claim 3 wherein:
said secondary belt width is substantially equal to said fourth axial of said drive pulley of said at least one drive wheel; and said fourth axial width is substantially equal to said third axial width of said output pulley of said transmission.

5. The arrangement defined in claim 4 wherein:
said first and second axial widths are greater than said third and fourth axial widths; and
said primary belt width is greater than said secondary belt width.

* * * * *